US007501976B2

(12) United States Patent
Manor

(10) Patent No.: US 7,501,976 B2
(45) Date of Patent: Mar. 10, 2009

(54) MONOPULSE TRAFFIC SENSOR AND METHOD

(76) Inventor: Dan Manor, 150 Bridgeland Avenue, Suite 204, Toronto, Ontario (CA) M6A 1Z5

( * ) Notice: Subject to any disclaimer, the term of this patent is extended or adjusted under 35 U.S.C. 154(b) by 67 days.

(21) Appl. No.: 11/557,322

(22) Filed: Nov. 7, 2006

(65) Prior Publication Data

US 2008/0129546 A1 Jun. 5, 2008

(51) Int. Cl.
*G01S 13/42* (2006.01)
*G08G 1/00* (2006.01)
*G08G 1/01* (2006.01)
*G08G 1/123* (2006.01)

(52) U.S. Cl. .................. 342/27; 342/107; 342/109; 342/113; 342/128; 701/117; 340/933; 340/936; 340/988

(58) Field of Classification Search ................ 342/27, 342/28, 69, 70, 90, 107, 109, 113–115, 128, 342/133, 140, 146; 701/117; 340/933
See application file for complete search history.

(56) References Cited

U.S. PATENT DOCUMENTS

| | | | | |
|---|---|---|---|---|
| 4,361,202 A * | 11/1982 | Minovitch | ............. | 180/168 |
| 4,985,705 A | 1/1991 | Stammler | | |
| 5,752,215 A * | 5/1998 | Zaaiman et al. | ............. | 701/117 |
| 5,943,476 A * | 8/1999 | Dougherty et al. | ......... | 700/259 |
| 6,404,506 B1 * | 6/2002 | Cheng et al. | ............... | 356/634 |
| 6,556,916 B2 | 4/2003 | Waite et al. | | |
| 6,614,536 B1 * | 9/2003 | Doemens et al. | ........... | 356/601 |
| 6,693,557 B2 | 2/2004 | Arnold et al. | | |
| 6,760,061 B1 * | 7/2004 | Glier et al. | ................. | 348/149 |
| 6,853,329 B2 | 2/2005 | Shinoda et al. | | |
| 6,980,134 B2 | 12/2005 | Ely et al. | | |
| 2004/0174294 A1 | 9/2004 | Arnold et al. | | |
| 2007/0015542 A1 * | 1/2007 | Manor | ....................... | 455/561 |
| 2007/0016359 A1 * | 1/2007 | Manor | ....................... | 701/117 |

(Continued)

OTHER PUBLICATIONS

The Effect of Squint on Telemetry Download Performance www.amsat.org/amsat/sats/ao40/articles/AO40Squint.html.

(Continued)

*Primary Examiner*—John B Sotomayor
(74) *Attorney, Agent, or Firm*—Bereskin & Parr

(57) ABSTRACT

A method and system for determining a position of a vehicle within a field of view using a traffic sensor are provided. This involves (a) mounting the traffic sensor at a fixed location relative to a road; (b) modulating a microwave signal to produce a periodic time-varying modulated signal; (c) radiating the periodic time-varying modulated microwave signal in a radiation beam at a vehicle on a road to generate a reflected modulated microwave signal, wherein the reflected periodic time-varying modulated microwave signal induces a first received signal at a first receiver antenna and a second received signal at a second receiver antenna, the second receiver being spaced from the first receiver; and, (d) determining the position of the vehicle on the road within the field of view based on the periodic time-varying modulated signal, the first received signal, and the second received signal, wherein the position of the vehicle is determinable during a single period of the periodic time-varying modulated signal. The position comprises a lateral position of the vehicle across a width of the road and a longitudinal position of the vehicle along a length of the road.

41 Claims, 5 Drawing Sheets

U.S. PATENT DOCUMENTS

| | | | |
|---|---|---|---|
| 2007/0030170 A1* | 2/2007 | Manor | 340/933 |
| 2007/0179712 A1* | 8/2007 | Brandt et al. | 701/300 |
| 2007/0236365 A1* | 10/2007 | Manor | 340/933 |
| 2007/0257819 A1* | 11/2007 | Manor | 340/933 |
| 2008/0129546 A1* | 6/2008 | Manor | 340/936 |

OTHER PUBLICATIONS

Monopulse antennas from Microwaves101.com.
International Search Report and Written Opinion, PCT/CA2007/001433, mailed Dec. 6, 2007.

* cited by examiner

MONOPULSE TRAFFIC SENSOR AND METHOD

FIELD

This invention relates to a traffic sensor for traffic monitoring, and more specifically to a monopulse radar system and method for use in a traffic sensor mounted at a fixed location with respect to a multilane road.

BACKGROUND

As urban centers increase in size, and traffic congestion becomes more common, the need for accurate and up-to-date traffic information also increases. Traffic surveillance relies primarily on traffic sensors, such as inductive loop traffic sensors that are installed under the pavement, video sensors and radar sensors.

SUMMARY

In accordance with an aspect of an embodiment of the invention, there is provided a method for determining a position of a vehicle within a field of view using a traffic sensor. The method comprises (a) mounting the traffic sensor at a fixed location relative to a road; (b) modulating a microwave signal to produce a periodic time-varying modulated signal; (c) radiating the periodic time-varying modulated microwave signal in a radiation beam at a vehicle on a road to generate a reflected modulated microwave signal, wherein the reflected periodic time-varying modulated microwave signal induces a first received signal at a first receiver antenna and a second received signal at a second receiver antenna, the second receiver being spaced from the first receiver; and, (d) determining the position of the vehicle on the road within the field of view based on the periodic time-varying modulated signal, the first received signal, and the second received signal, wherein the position of the vehicle is determinable during a single period of the periodic time-varying modulated signal. The position comprises a lateral position of the vehicle across a width of the road and a longitudinal position of the vehicle along a length of the road.

In accordance with a further aspect of an embodiment of the invention, there is provided a traffic sensor for obtaining vehicular traffic data within a field of view. The sensor comprises 1) a transceiver unit for generating a frequency modulated microwave signal; 2) at least one transmitter antenna for (i) receiving the modulated microwave signal from the transceiver unit, (ii) forming a radiation beam, and (iii) radiating a transmitted radiated signal, comprising the modulated microwave signal in the radiation beam, at a vehicle; 3) a first receiver antenna for (i) receiving the modulated microwave signal reflected back from the vehicle, and (ii) generating a first received signal; 4) a second receiver antenna for (i) receiving the modulated microwave signal reflected back from the object, and (ii) generating a second received signal, wherein the first receiver antenna is spaced from the second receiver antenna, and the transceiver unit is connected to the first receiver antenna and to the second receiver antenna, to receive the first received signal from the first receiver antenna and the second received signal from the second receiver antenna; and, 5) a processor unit for determining a velocity and a position of a vehicle on a road, wherein the velocity is measured relative to the road and wherein the position comprises a lateral position of the vehicle across a width of the road and a longitudinal position of the vehicle along a length of the road. The processor unit is operable to determine the velocity and the position of the vehicle on the road by (a) determining the two-dimensional position of the vehicle on the road based on the time-varying modulated signal, the first received signal, and the second received signal during a single period of the time-varying modulated signal; and, (b) repeating (a) at multiple times when the vehicle is within the field of view to determine a sequence of vehicle positions in two dimensions and the velocity of the vehicle from the sequence of vehicle positions in two dimensions.

BRIEF DESCRIPTION OF THE DRAWINGS

A detailed description of preferred embodiments is provided herein below with reference to the following drawings, in which.

DETAILED DESCRIPTION

Figure 1:
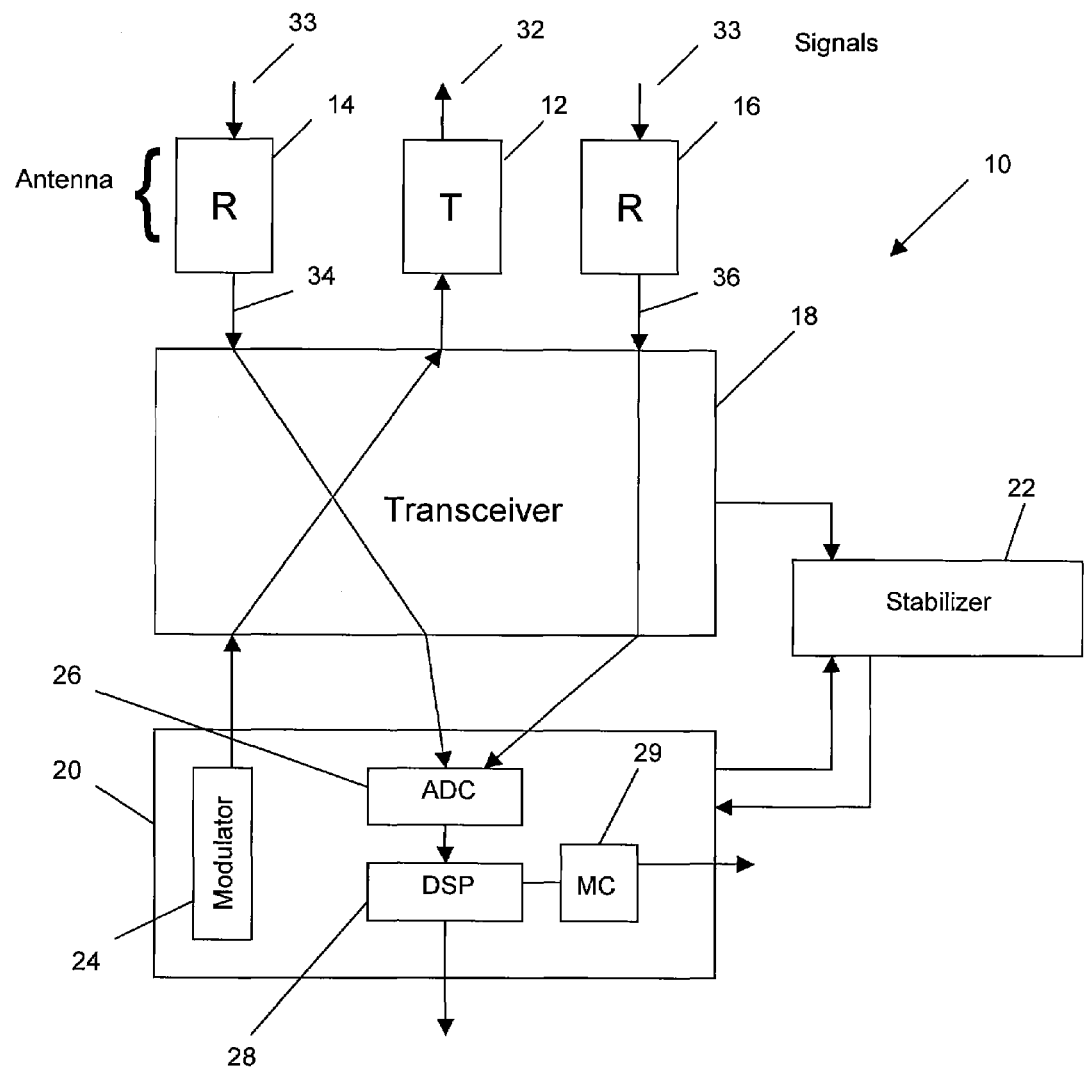
FIG. 1, in a block diagram illustrates a monopulse traffic sensor in accordance with an aspect of the present invention.

Referring to FIG. 1, illustrated therein is a monopulse traffic sensor 10 made in accordance with an embodiment of the present invention. Monopulse traffic sensor 10 comprises a transmitting antenna 12 and two receiving antennas 14 and 16. Each of the antennas is in electrical communication with transceiver 18, which in turn is in electrical communication with processor unit 20 and stabilizer 22.

Processor unit 20 comprises modulator 24, analog to digital converter (ADC) 26 and digital signal processor (DSP) 28. Modulator 24 generates a programmable time-varying modulating signal that is received by the transceiver unit 18. The transceiver unit 18 takes the programmable time-varying modulating signal and generates a modulated microwave signal that is received by the transmitting antenna 12. The antenna 12 then forms a radiation beam and radiates the modulated microwave signal in the radiation beam 32 at an object or objects, such as a vehicle (shown in FIG. 4) or several vehicles. Reflected signal 33 is received by receiver antennas 14 and 16 as a result of reflections from the roadway and vehicles on the roadway of signal 32. Each receiver antenna produces a received signal as a result of reflected signal 33. Thus, first receiver antenna 14 produces received signal 34 and second receiver antenna 16 produces received signal 36.

In various embodiments, sensor 10 may further comprise one or more timers for determining an elapsed time. Each timer may be linked to processor unit 20 and may comprise any appropriate device for measuring time. For example, the elapsed time could be measured by a clock signal internal to processor unit 20 and therefore processor unit 20 may comprise the timer. Alternatively, the timer could be a device separate from processor 20. The timer itself could determine the elapsed time or it could provide a signal to processor unit 20 from which processor unit 20 can determine the elapsed time.

In some embodiments, sensor 10 may comprise a memory module that is linked to processor unit 20. The memory module may comprise any appropriate device for storing data. For example, the memory module may comprise a solid state memory device such as flash memory, SRAM, and DRAM. The above examples are not intended to be limiting in any manner. Furthermore, memory module may be part of or separate from processor unit 20.

The signal-stabilizing unit 22 receives a calibration portion of the modulated microwave signal produced by the transceiver. The signal-stabilizing unit 22 then derives a proportional calibration signal, which is measured by a processor-controlled circuit (not shown). The processor-controlled circuit then derives corrections based on these measurements, which are used by the modulator 24 to correct the programmable time varying modulating signal. Optionally, DSP 28 may be this processor that derives corrections based on the measurements of the proportional calibration signal. Alternatively, the processor that derives corrections based on the measurements of the proportional calibration signal may be a separate processor, possibly part of modulator 24.

Each of the microwave signals received by receiver antenna 14 or 16, is propagated to transceiver 18. At transceiver 18, first received signal 34 and second received signal 36 are each mixed with the transmitter signal. The resulting signals are then low pass filtered. This effectively down converts the received signals to produce intermediate frequency (IF) signals. Specifically, first received signal 34 is down converted to a first intermediate frequency signal and second received signal 36 is down converted to a second intermediate frequency signal. Each of the intermediate frequency signals has a lower frequency than the received frequency signal from which it is produced; however, the frequency shift, phase shift, and amplitude characteristics with respect to the transmitter signal are preserved. Specifically, the frequency shift, phase shift, and amplitude characteristics of first received signal 34 with respect to the transmitter signal are substantially the same as the frequency shift, phase shift, and amplitude characteristics of the first intermediate frequency signal with respect to the transmitter signal. An analogous situation exists as between the second received signal 36 and the second intermediate frequency signal.

Each intermediate frequency signal is amplified in the transceiver and then forwarded to the ADC 26 of processor unit 20. ADC 26 converts each sample of the first and second intermediate frequency signal, which are analog signals, into a digital signal to provide first and second digitized signals respectively. Each of the first and second digitized signals is then propagated to DSP 28. DSP 28 processes the signals and extracts several parameters from the two signals such as the angle of arrival and range of the target. The extracted parameters of the target are then provided to microcomputer chip (MC) 29 for target tracking, analysis and reporting. Specifically, MC 29 comprises an internal, non-volatile memory (not shown) on which instructions for target tracking and analysis can be stored. MC 29 may also be operable to subsequently configure this data for transmission to an external traffic management system.

Figure 2:
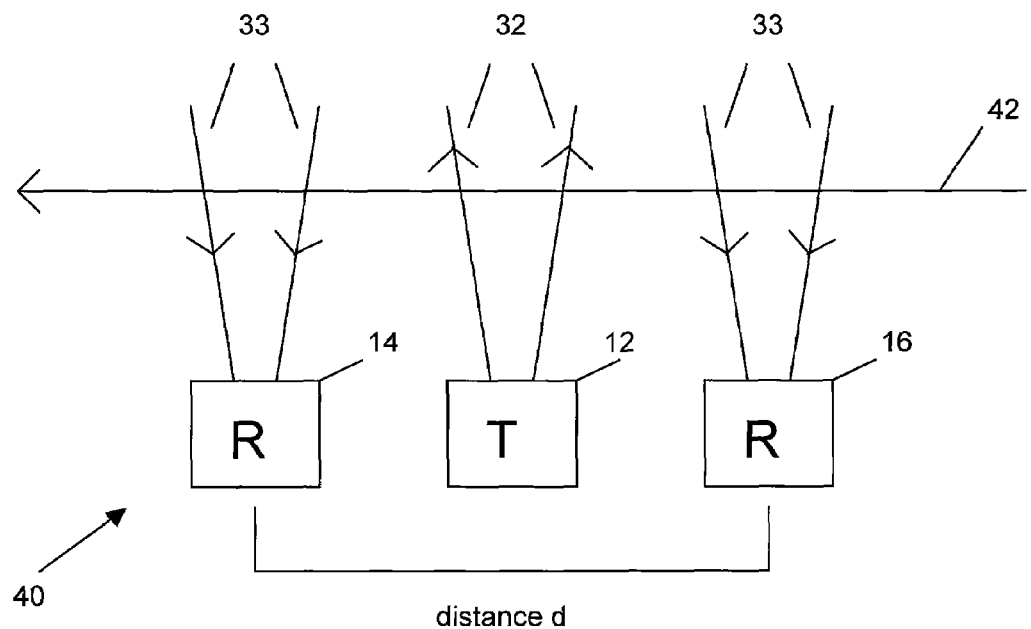
FIG. 2 is a schematic diagram of the sensor of FIG. 1 in the side fire configuration.

FIG. 2, in a schematic diagram, illustrates the sensor of FIG. 1 in the side fire configuration 40. In the side fire configuration, the signals 32 and 33 are transmitted and reflected at an angle that is roughly perpendicular to the path 42 of the target vehicles.

Figure 3:
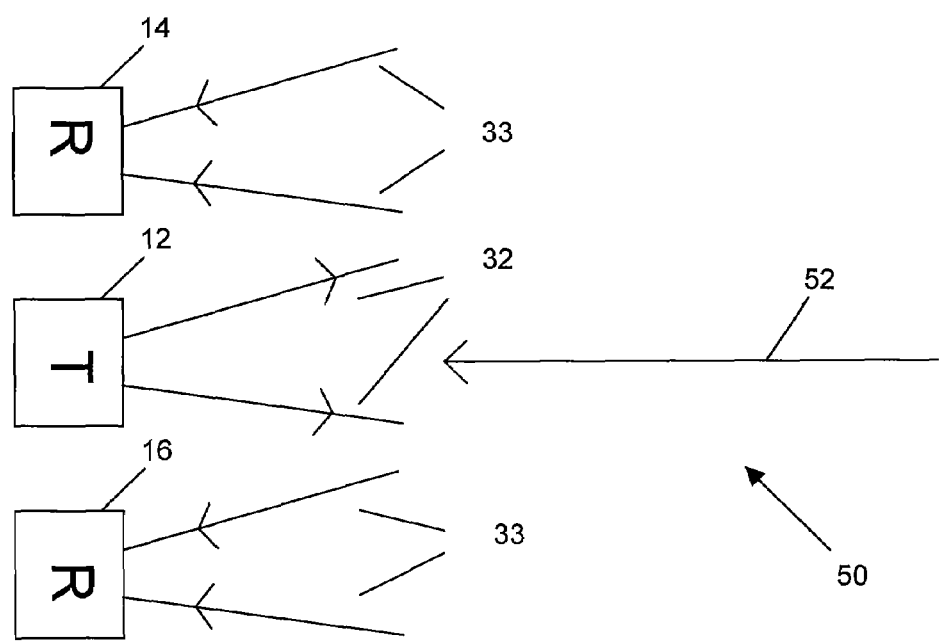
FIG. 3 is a schematic diagram of the sensor of FIG. 1 in the forward looking configuration.

FIG. 3, in a schematic diagram, illustrates the sensor of FIG. 1 in the forward looking configuration 50. In the forward looking configuration, the signals 32 and 33 are transmitted and reflected at an angle that is roughly parallel to the path 52 of the target vehicles.

Various other embodiments utilize other configurations than the side fire configuration or the forward-looking configuration. In particular, some embodiments may utilize a diagonal fire configuration. In the diagonal fire configuration the signals 32 and 33 are transmitted and reflected at an angle that is neither perpendicular nor parallel to the velocities of vehicles on the road. In particular, in the diagonal fire configuration, signal 32 may be characterized by a first vector, which is resolvable into a second and third vector. The second vector is roughly perpendicular to the direction of traffic. The third vector is roughly parallel to the direction of traffic. An analogous set of vectors characterizes signal 33 as well.

Figure 4:
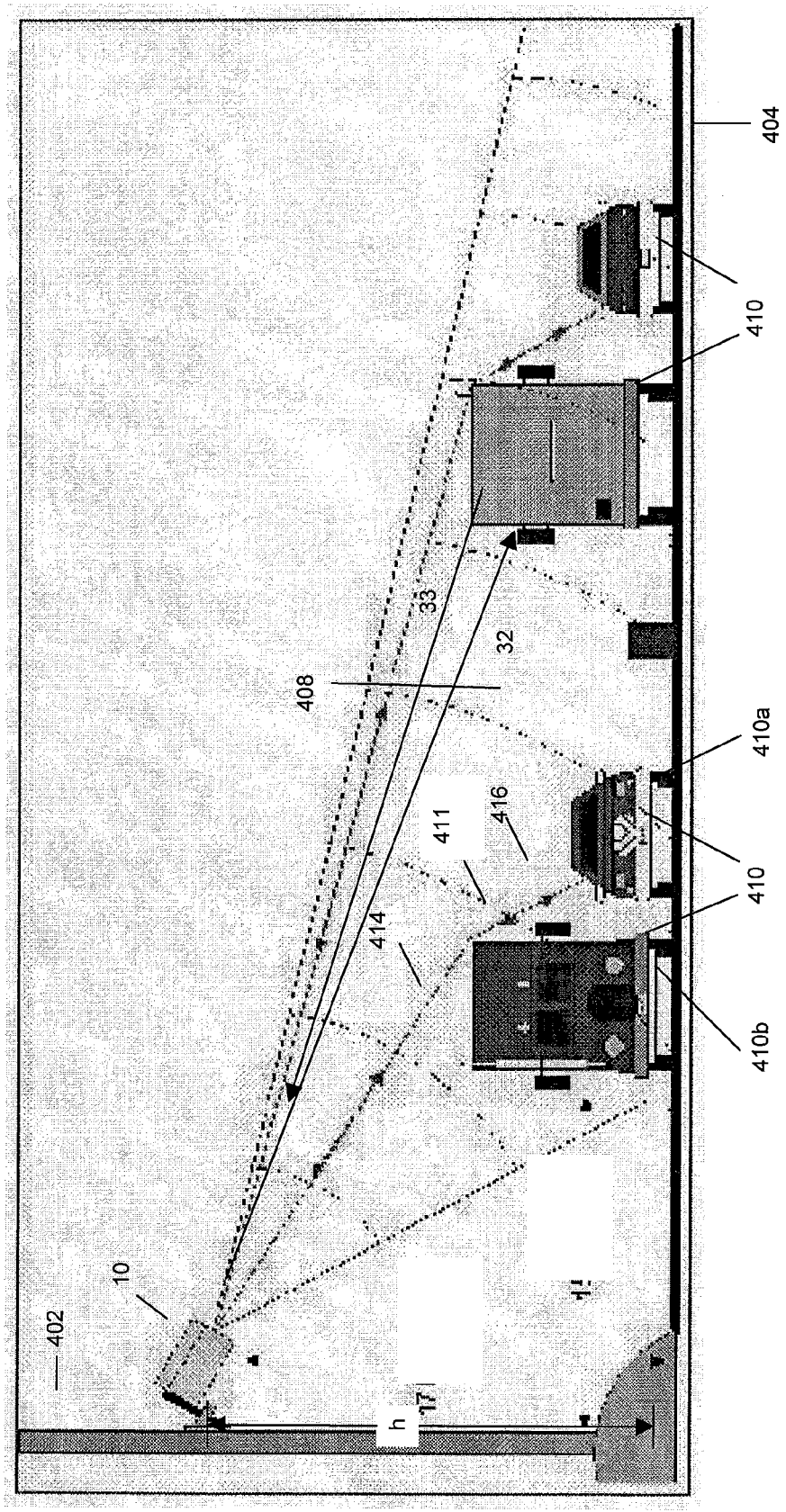
FIG. 4 in a schematic view illustrates the sensor of FIG. 1 mounted in the side fired configuration.

Referring to FIG. 4, there is illustrated in a schematic view, the monopulse traffic sensor 10 mounted in the side fire configuration on a pole 402 at the side of the roadway 404. Transmit antenna 12 (shown in FIG. 2) of sensor 10 transmits a signal 32 through a field of view 408 at the road 404 to "paint" a long elliptical footprint on the road 404. Any non-background targets, such as vehicles 410, reflect signals such as signal 33, which adds to the static background signal (clutter) and so is detectable and distinguishable by the sensor.

In the exemplary embodiment, the signal 32 transmitted by the transmit antenna 12 is a frequency modulated continuous wave (FMCW) signal. The modulator sweeps through a range of frequencies. Specifically, the low-power microwave signal 32 transmitted by sensor 10 has a constantly varying frequency, as controlled by the periodic modulating signal. Based on the frequency of the reflected signal 33 with respect to the transmitter frequency, the sensor can determine when the original signal was transmitted, thereby determining the time elapsed and the range to the reflecting object.

Sensor 10 can be mounted at a height h on pole 402. In some embodiments the height is 5 meters. The side fired configuration is capable of detecting occluded vehicles. For example, in FIG. 4 vehicle 410*a* is occluded behind vehicle 410*b*. However, a signal from sensor 10 is able to reach vehicle 410*a* along paths 414 and 416. A signal reflected off vehicle 410*a* is able to reach sensor 10 by traversing the same path in reverse. This is possible because a signal traveling along path 414 is reflected by edge 411 in various directions including along path 416. An analogous affect is experienced by the signal that is reflected off vehicle 410*a* in the direction of path 416. The reflected signals received from vehicles 410*a* and 410*b* can be distinguished from one another through the range information and through the angle of arrival information.

In various embodiments, regardless of whether the sidefire, forward looking, or diagonal fire configurations are used, receiver antennas 14 and 16 are placed on one or more sides of the transmit antenna 12 and are spaced apart from each other by a distance d. The combined field of views of the receiver antennas 14 and 16 essentially overlap that of the transmit antenna 12. In some embodiments, the antennas may be said to have a squint angle of 0. The squint angle may be defined as the angle subtended by the main axes of each receiver antenna with respect to each other. When the squint angle is 0 the signals 34 and 36 will generally differ only in phase but not amplitude. The phase difference results from the fact that the antennas are not collocated but are rather separated by a distance d. This means that except for the special case where the target is directly in front of the radar, each of the receiver antennas 14 and 16 will be a slightly different distance from the target. This in turn means that the time it takes for the reflected signal to reach each of the receiver antennas will be slightly different. As a result of this difference in timing, the signals 34 and 36 received by each of the receiver antennas will be out of phase with each other. In the case where the target is directly in front of the radar, the target will be equidistant from each of the receiver antennas 14 and 16. In this case the reflected signal will reach each of the receiver antennas 14 and 16 at the same time and therefore the received signals 34 and 36 will be in phase. When there is no squint angle between the receiver antennas 14 and 16, the amplitudes of signals 34 and 36 will not be appreciably different.

Alternatively, the receiver antennas 14 and 16 may be set up such that there is a squint angle between them: that is, their main axes are not parallel. In such a case, the received signals 34 and 36 will generally vary in both amplitude and phase. The reason for the phase difference is the same as that explained above. The reason for the difference in amplitude is that generally the reflected signal will intercept each of the receiver antennas at a different angle to its main axis. This will produce a difference in the amplitude between the two received signals 34 and 36 because the amplitude of the induced signal in an antenna depends on the angle between the antenna axis and the electric field inducing the signal.

The use of the two receiver antennas, allows for the measurement of the angle of arrival from even a single "pulse" or every modulation period of the signal—hence the name monopulse. The angle of arrival is defined as the angle relative to the boresight of the transmit antenna at which the reflected signal arrives at sensor 10. The angle of arrival may be determined, within a certain margin of error, by subtracting one of the received signals from the other. In the exemplary embodiment the margin of error is approximately 5 degrees. The angle of arrival along with the range information may be used to determine the location of the target vehicle in a two-dimensional plane.

More specifically, the difference in phase or amplitude between the two induced signals may be used to determine the angle of arrival. As described above, the phase of the signal received by either of receiver antennas 14 and 16 can be used to determine the distance from such receiver antenna to the target; however there is an ambiguity as to the target location. The difference in the phases of the signals received by each of these antennas 14 and 16 can also be used to determine the difference in the distance from each of the antennas 14 and 16 to the target thereby removing the ambiguity. Once this difference is known, it is a matter of trigonometry to determine the unambiguous position of the target relative to the sensor 10; in other words, it is a matter of trigonometry to determine the angle of arrival of the target signal.

Thus, when phase monopulse is used, it is important to preserve the phase difference between the first and second received signals. Therefore, if the first and second received signals are processed in some manner, such as by either being down converted or digitized, then it is preferable that they be processed in a manner that preserves the phase difference between them. This could for example, be done by simultaneously processing the signals in equivalent circuits. This would ensure that any delay introduced into one signal would be equal to the delay in the other signal and therefore the phase difference would remain constant. However, given that the angle of arrival is derived from the phase and not the amplitude, it is not necessary to preserve the amplitude difference between the two signals.

For example, as explained above, in the case of a phase difference, the difference in phase determines the difference in length of the path traveled by the reflected signal to each antenna. In addition, as explained above, the frequency of the reflected signal determines the range of the target relative to the transmit antenna. Thus, knowing this distance, the difference in the distance between the target and each receiver antenna, as well as the distance between the two antennas, one can determine the position of the target relative to the sensor 10 in a two dimensional plane.

With amplitude monopulse, the antennas 14 and 16 are oriented at a squint angle relative to one another such that a difference in amplitude results. As mentioned above, the resulting signal amplitude in each antenna is dependent on the angle at which the signal intercepts the antenna. Knowing the amplitude of the signal in each antenna, the angle between the two antennas, as well as the distance to the target one can determine the position of the target relative to sensor 10 in a two dimensional plane.

Thus, when amplitude monopulse is used, it is important to preserve the amplitude difference between the first and second received signals. Therefore, if the first and second received signals are processed in some manner, such as by either being down converted or digitized, then it is preferable that they be processed in a manner that preserves the amplitude difference between them. This could for example, be done by ensuring that when the first and second received signals are processed, their amplitudes are affected in a substantially equivalent manner. Thus, if any gain or attenuation is introduced in one signal an equivalent gain or attenuation should be added to the other signal. However, given that the angle of arrival is derived from the amplitude and not the phase, it is not necessary to preserve the phase difference between the two signals.

Thus, various embodiments of sensor 10, regardless of whether they use phase or amplitude information, are able to determine the position of the target relative to sensor 10 in a two dimensional plane. In other words, the position of a target vehicle could be determined as a combination of a lateral position across the width of the road and a longitudinal position along the length of the road. Since the position of the target can be determined within a two-dimensional plane, sensor 10 is able to determine the lane in which the vehicle is traveling.

In the side fire configurations, the use of range information may suffice to estimate a lateral position across the length of the road. For example, it may be possible to estimate which lane the target vehicle is traveling in based on the range information alone. However, the addition of the angle of arrival information allows for the accurate placement of the vehicle in a longitudinal position along the length of the road, as well as a lateral position across the width of the road.

Similarly, in forward-looking configurations, the range information may be sufficient to roughly estimate a longitudinal position of a target vehicle along a length of the road. However, the addition of the angle of arrival information allows for the accurate placement of the vehicle in a lateral position across the width of the road, as well as a longitudinal position along the length of the road. For example, this could be used to determine which lane the vehicle is traveling in.

When sensor 10 is mounted in neither a side fire configuration nor a forward-looking configuration, it may not be possible to estimate either the longitudinal or lateral position of the target vehicle from range information alone. In such a case, the use of both the range information and the angle of arrival information may allow both the longitudinal position and the lateral position of the vehicle on the road to be determined. Thus, as can be seen from the above discussion, regardless of the configuration in which sensor 10 is mounted, the angle of arrival information is helpful in determining at least one of the lateral and longitudinal positions of the vehicle on the road.

Figure 5:
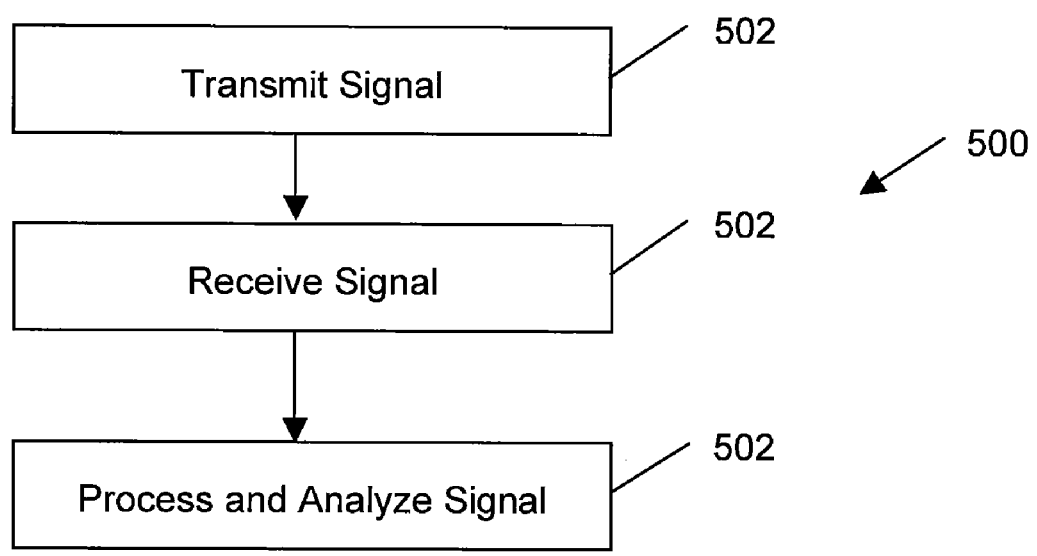
FIG. 5 is a flow chart diagram of the basic steps taken by the sensor of FIG. 1; and, FIG. 6 is a flow chart diagram of the steps taken by the processing unit of FIG. 1 when processing a received signal.

Reference is now made to FIG. 5, which in a flow chart illustrates the steps 500 taken by monopulse traffic sensor 10. At step 502, the signal is transmitted. At step 504, the reflected signal is received. At step 506, the signal is processed and analyzed.

Figure 6:
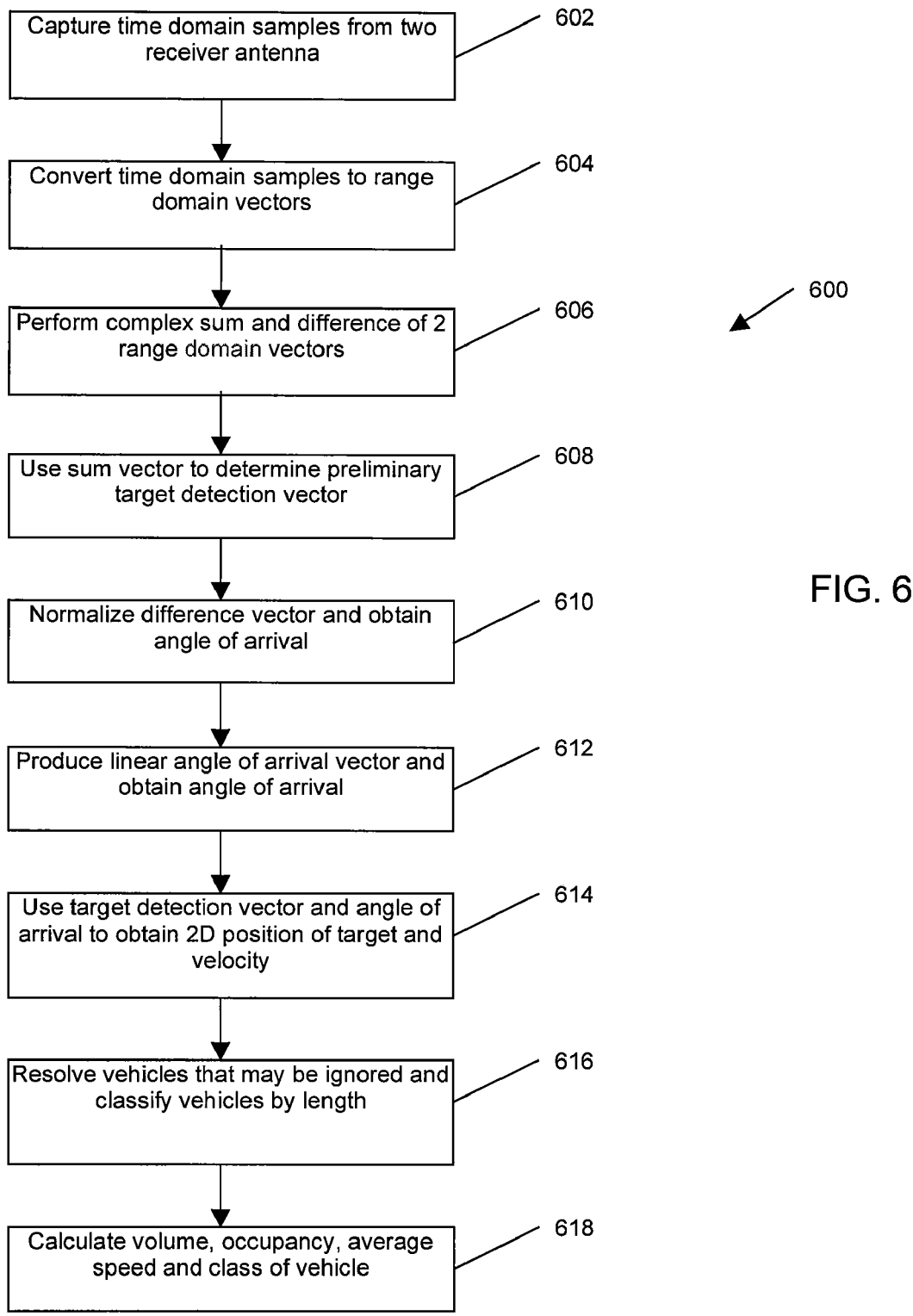

Reference is now made to FIG. 6, which in a flow chart illustrates the steps 600 taken by the processing unit 20 in processing and analyzing the received signals. This diagram corresponds to step 506 of FIG. 5. At step 602, ADC 26 captures time domain samples from the two receiver antennas and provides the digitized signal to DSP 28. At step 604, the time domain samples are converted to range domain vectors. This step preserves the amplitudes and phases of each of the received signals relative to the time domain vector. This step is accomplished by performing a weighted complex Fast Fourier Transformation (FFT) process on the two signals.

At step 606, a complex sum and difference is performed on the two range domain vectors derived from the two received signals from the corresponding two receivers, thereby yielding sum and difference vectors, $\Sigma_i$ and $\Delta_1$, where i designates range bin number.

At step 608, the sum vector $\Sigma_i$ is used as a preliminary target detection vector $R_i$. This is accomplished by ignoring the phase and summing the amplitude of the two signals. This yields a better signal to noise ratio and provides a better signal for detecting target vehicles by combating phase interference that may cause nulls.

Nulls occur when a vehicle, which is moving through the field of view of a sensor, is at such a position with respect to the sensor that the complex radar-cross section of the vehicle causes the amplitude of the received signal at a receiver antenna of the sensor to fall to a low level. In some cases, this could lead the sensor to erroneously conclude that the vehicle is no longer within its field of view. This in turn can cause the sensor to drop the presence detection of the target vehicle and consequently ignore the vehicle. In addition, when the vehicle leaves the position at which the null occurred and the amplitude of the received signal rises to a higher level, the sensor may erroneously conclude that a new vehicle has entered its field of view. Thus, if the sensor were used to count the number of vehicles moving through its field of view on the road, then this could lead to an erroneous count. However, the use of two antennas in various embodiments of traffic sensor 10 can reduce the effect of nulls and improve overall sensor performance.

In various embodiments of traffic sensor 10, the level of the received signal in each range i is used to detect the presence and range of the target. Detection is based upon the signal exceeding the background level. Due to limitations in the sensor's resolution, typically a received signal will "spill" its energy into several range bins. In such a case, the target vehicle's range can be determined to be the point at which a local peak of the amplitude of the received signal occurs.

An important limiting factor on a sensor's accuracy is its ability to detect targets that are occluded by other targets (such as vehicle 410a depicted in FIG. 4). Although signal diffraction allows for the reception of reflected signals from the occluded target, in many cases these signals will be lower in amplitude than those of the clearly visible target. In such a case, the occluded target's signal may not be the peak signal and may therefore be ignored. However, in various embodiments of traffic sensor 10, the addition of another parameter, namely the angle of arrival, allows the processor to improve its resolution of distinct targets in such cases, leading to improved performance.

At step 610, the difference vector $\Delta_i$ is normalized by dividing it by the sum vector $\Sigma_i$. This produces a vector that yields an amplitude invariant angle of arrival. The normalization process corrects for any errors, which may occur as a result of weak signals. Even within nulls or low signal levels, the phases of the signals are preserved, allowing angle processing. Therefore, the normalization provides for an unambiguous function for converting the differences in the signals into angle of arrival information.

At step 612, various corrections are performed on the normalized vector ($\Delta_i/\Sigma_i$) produced at step 610. Some examples of the corrections that could be performed include: linearization of the arcSin function, corrections against very weak signals and 'guard' functions against Multipathing. This step yields a linear angle of arrival vector $\alpha_i$.

At step 614, the target detection vector $R_i$ and linear angle of arrival vector at are used to obtain a 2D position vector of each target vehicle. In addition, the position of each vehicle is tracked to determine the vehicle's velocity vector. More specifically, the position is determined multiple times while the vehicle is in the field of view to provide a sequence of positions in two dimensions defined by a position vector. The velocity can then be calculated from the rate of change of the position vector within a given time frame.

At step 616, the information produced in the previous steps is integrated in order to provide additional information. For example, integrating the information makes it possible to resolve vehicles that may otherwise have been ignored. For example, the vectors can be integrated over distance, which would reveal a curve of signal strength at specific distances. This information could reveal all objects in the field of view of sensor 10, including vehicles occluded by other vehicles. As discussed above, reflections from occluded vehicles produce very weak received signal strengths. Normally these weak signals might be ignored as noise. However, integration of the vectors would reveal a continuous pattern of the weak signal at a given distance, which represents a reflecting object. In contrast, noise would result in a random pattern. Therefore, a vehicle that might normally be ignored would be more likely to be detected.

This same process reveals the length of each vehicle in that the integration of the vectors would reveal where each reflection begins and where it ends. This information allows for the calculation of the length of each vehicle detected by the sensor 10. Alternatively, the length can also be determined from dwell time and velocity of the vehicle. More specifically, the dwell time can be measured as the total amount of time that the vehicle is present within field of view of sensor 10. The dwell time may be measured by the timer mentioned above. Then the velocity along with the dwell time can used to determine the length of the vehicle. Following that the vehicle can be classified according to its length.

The various classes may be stored in the above-mentioned memory module. The number of classes and types of classes may vary between embodiments. For example, some embodiments may use categories such as trucks, midsized cars, small cars and motorcycles. Other embodiments may use different categories and may use a different number of categories.

At step 618, the information is further integrated to produce statistical information such as the volume of traffic on the roadway, the occupancy, the average speed of vehicles, and the vehicle length class distribution by lane of roadway.

In various embodiments traffic sensor 10 is capable of determining statistical vehicle data. For example, in some embodiments, traffic sensor 10 is capable of determining the number of vehicles traveling in the direction of traffic. More specifically, in some embodiments this is achieved by processor 20 incrementing a counter for each vehicle detected traveling in the direction of traffic.

In various other embodiments, sensor 10 can determine the average velocity of vehicles traveling in the direction of traffic in one direction along the road, by processor 20 first summing the velocity of each vehicle detected traveling in the direction of traffic on the road and then dividing the result by the number of vehicles detected traveling in the direction of traffic.

Furthermore, in some embodiments, sensor 10 can determine the number of vehicles traveling in a lane, by processor 20 incrementing a counter for each vehicle detected traveling in the lane.

In some embodiments, sensor 10 can calculate the average velocity of vehicles in a lane, by processor 20 summing the velocity of each vehicle detected traveling in the lane and then dividing this sum by the number of vehicles detected traveling in the lane.

Moreover, in certain embodiments, sensor 10 can determine the occupancy of a lane of the roadway, by processor 20 determining a sum of dwell-time of all vehicles detected traveling in the lane during the elapsed time, and then dividing the sum of dwell-time of all vehicles detected traveling in the lane by the elapsed time. The elapsed time may be determined by use of the timer described above.

Further still, in some embodiments, sensor 10 can determine the number of vehicles in a class of vehicles traveling on the road. Processor 20 can determine this by incrementing a counter for each vehicle detected in the class. For example, processor 20 may classify vehicles over a predetermined length as trucks. Then, by applying the above-described method, processor 20 can determine the number of trucks traveling on the highway. Moreover, processor 20 may perform these steps in relation to a number of different classes of vehicles. This information can then be used to determine the breakdown of vehicular traffic on the road by class of vehicle.

Similarly, in some embodiments, processor 20 can determine the number of vehicles in a class of vehicles traveling in a lane of the road, by incrementing a counter for each vehicle in a class of vehicles detected traveling in the lane of the road. Thus, processor 20 may use this method to determine the number of trucks traveling in a specific lane of the road such as the left most lane. Similarly, processor 20 may use this method to determine the number of midsized cars traveling in each lane of the road. In various embodiments, processor 20 may perform these steps in relation to a number of different lanes and classes of vehicles. This information may then be used to determine the breakdown of vehicular traffic by class of vehicle in each lane of traffic.

Furthermore, in various embodiments, processor 20 may determine the average velocity of vehicles in a class of vehicles. Processor 20 may accomplish this by summing the velocities of all vehicles detected in a class of vehicles and dividing by the total number of vehicles detected in the class. For example, this could be used to determine, the average velocity of midsized cars traveling on the road. More generally, in various embodiments, this information can be used to determine the average velocity for each class of vehicles traveling on the road.

Similarly processor 20 may determine the average velocity of vehicles in a class of vehicles traveling in a lane by first summing the velocities of all vehicles in the class of vehicles traveling in the lane and then dividing by the total number of vehicles in the class of vehicles detected in the lane. This could for example be used to determine the average speed of trucks in a particular lane of the road. In various embodiments, processor 20 may perform these steps in relation to a number of different classes of vehicles and lanes of the road. Thus, this information may be utilized in order to determine the average velocity of each class of vehicle traveling in each lane of the road.

In some embodiments, sensor 10 may transmit signals to an external traffic management system. These signals may be transmitted through, for example, a network. In various embodiments, sensor 10 is capable of transmitting traffic data to an external traffic management system. These signals may be further processed by the external traffic management system. In some embodiments, some or all of the above-described determination of traffic data statistics may occur at the external traffic management system. For example, the average speed of vehicles in a class of vehicles or the average speed of vehicles in a given lane may be determined at the external traffic management system.

Other variations and modifications of the invention are possible. All such modifications or variations are believed to be within the sphere and scope of the invention as defined by the claims appended hereto.

The invention claimed is:

1. A method for determining a position of a vehicle within a field of view using a traffic sensor, the method comprising:
   a) mounting the traffic sensor at a fixed location relative to a road;
   b) modulating a microwave signal to produce a periodic time-varying modulated signal;
   c) radiating the periodic time-varying modulated microwave signal in a radiation beam at a vehicle on a road to generate a reflected modulated microwave signal, wherein the reflected periodic time-varying modulated microwave signal induces a first received signal at a first receiver antenna and a second received signal at a second receiver antenna, the second receiver being spaced from the first receiver; and,
   d) determining the position of the vehicle on the road, wherein the position comprises a lateral position of the vehicle across a width of the road and a longitudinal position of the vehicle along a length of the road, within the field of view based on the periodic time-varying modulated signal, the first received signal, and the second received signal, wherein the position of the vehicle is determinable during a single period of the periodic time-varying modulated signal.

2. The method as defined in claim 1 wherein step d) comprises determining a difference between the first received signal and the second received signal to determine at least one of the lateral position and longitudinal position of the vehicle within the field of view.

3. The method as defined in claim 2 wherein step d) comprises,
   determining an angle of arrival of the reflected periodic time-varying modulated microwave signal based on the periodic time-varying modulated signal, and the difference between the first received signal and the second received signal;
   determining the range of the vehicle by comparing one of the received signals to the radiated signal; and,
   determining the lateral position and the longitudinal position of the vehicle from the range and angle of arrival.

4. The method as defined in claim 3 wherein step c) comprises radiating the periodic time-varying modulated microwave signal in the radiation beam at the vehicle on the road from a side fire position at a side of the road, wherein the radiation beam is substantially perpendicular to a direction of traffic on the road.

5. The method as defined in claim 4 further comprising repeating step d) at multiple times when the vehicle is within the field of view to determine a sequence of positions in two dimensions and the velocity of the vehicle from the sequence of vehicle positions in two dimensions.

6. The method as defined in claim 5 further comprising determining
   a dwell time of the vehicle within the field of view; and,
   a length of the vehicle based on the dwell time and the velocity of the vehicle.

7. The method as defined in claim 6 further comprising providing a plurality of vehicle classifications; and,
   assigning a classification within the plurality of vehicle classifications to the vehicle based on the length of the vehicle.

8. The method as defined in claim 3 wherein step c) comprises radiating the periodic time-varying modulated microwave signal in the radiation beam at the vehicle on the road from a forward fire position over the road, wherein the radiation beam is substantially parallel to a direction of traffic on the road.

9. The method as defined in claim 8 wherein step (d) comprises determining a lane occupied by the vehicle based on the lateral position of the vehicle.

10. The method as defined in claim 3 wherein
    a frequency of the periodic time-varying modulated signal varies at a known rate of change of frequency;
    the difference is a difference in phase between the first received signal and the second received signal; and,
    at least one of the longitudinal position and the lateral position of the vehicle within the field of view is determined based on the known rate of change of frequency and the difference in phase between the first received signal and the second received signal.

11. The method as defined in claim 3 wherein
    the first receiver antenna is oriented to be parallel to a first axis;
    the second receiver antenna is oriented to be at a non-zero angle to the first axis;
    the difference is a difference in amplitude between the first received signal and the second received signal; and,
    the angle of arrival of the vehicle within the field of view is determined based on the difference in amplitude between the first signal and the second signal.

12. The method as defined in claim 1 wherein step c) comprises radiating the modulated microwave signal in the radiation beam at the vehicle on the road from a diagonal fire position with respect to the road, wherein i) the radiation beam is characterized by a first vector, ii) the first vector is resolvable into a second vector and a third vector, iii) the third vector is orthogonal to the second vector, iv) the second vector is substantially parallel to a direction of traffic on the road, and v) the third vector is substantially perpendicular to the direction of traffic on the road.

13. The method as defined in claim 1 further comprising:
    down converting the first received signal to produce a first intermediate frequency signal, wherein the frequency of the first intermediate frequency signal is less than the frequency of the first received signal; and,
    down converting the second received signal to produce a second intermediate frequency signal, wherein the frequency of the second intermediate frequency signal is less than the frequency of the second received signal;
    wherein a difference in a selected characteristic between the first intermediate frequency signal and the second intermediate frequency signal substantially corresponds to a difference in the selected characteristic between the first received signal and the second received signal, wherein the selected characteristic is at least one of phase and amplitude;
    wherein step d) comprises determining the position of the vehicle on the road based on the first intermediate frequency signal, the second intermediate frequency signal and a modulated intermediate frequency signal corresponding to, and having a lower frequency than, the modulated signal.

14. The method as defined in claim 13 further comprising:
    digitizing the first intermediate frequency signal to produce a first digitized signal; and,
    digitizing the second intermediate frequency signal to produce a second digitized signal;
    wherein a difference in the selected characteristic between the first digitized signal and the second digitized signal substantially corresponds to a difference in the selected characteristic between the first intermediate frequency signal and the second intermediate signal;
    wherein step d) comprises determining a position of the vehicle on the road based on the first digitized signal, the second digitized signal, and a digital modulated signal corresponding to the modulated intermediate frequency signal.

15. The method as defined in claim 14 wherein step d) further comprises:
    determining a sum of the first digitized signal and the second digitized signal;
    determining a difference between the first digitized signal and the second digitized signal;
    dividing the difference by the sum to produce a normalized difference; and,
    determining the angle of arrival from the normalized difference.

16. The method as defined in claim 1 further comprising:
    incrementing a vehicle count for each vehicle detected traveling in a direction of traffic.

17. The method as defined in claim 16 further comprising:
    for each vehicle detected traveling in the direction of traffic:
    determining a velocity of each vehicle;
    determining a velocity sum by summing the velocity of each vehicle; and,
    determining an average velocity of vehicles traveling in the direction of traffic by dividing the velocity sum by the vehicle count.

18. The method as defined in claim 1 further comprising:
    selecting a selected lane; and,
    incrementing a selected-lane vehicle count for each vehicle detected in the selected lane.

19. The method as defined in claim 18 further comprising:
    for each vehicle detected in the selected lane:
    determining a velocity of each vehicle;
    determining a selected-lane velocity sum by summing the velocity of each vehicle; and,
    determining an average velocity of vehicles in the selected lane by dividing the selected-lane velocity sum by the selected-lane vehicle count.

20. The method as defined in claim 18 further comprising:
    determining a dwell time of each vehicle within the selected lane during an elapsed time; and,
    determining a lane occupancy by i) determining a sum of the lane vehicle dwell-times during the elapsed time and then ii) dividing the selected-lane vehicle dwell-time sum by the elapsed time.

21. The method as defined in claim 1 further comprising:
repeating step d) at multiple times when the vehicle is within the field of view to determine a velocity of the vehicle;
determining a dwell time of the vehicle within the field of view;
determining a length of the vehicle based on the dwell time and the velocity of the vehicle;
providing a plurality of vehicle classifications wherein the classification is based on the length of a vehicle; and,
for each class of vehicles in the plurality of vehicle classifications, incrementing a class vehicle count for each vehicle detected in that class of vehicles.

22. The method as defined in claim 21 further comprising, for a least one class of vehicles,
determining a class velocity sum by summing the velocity of each vehicle in the class of vehicles; and,
determining an average velocity of vehicles in the class of vehicles by dividing the class velocity sum by the class vehicle count.

23. The method as defined in claim 1 further comprising:
selecting a selected lane;
providing a plurality of vehicle classifications wherein the classification is based on the length of a vehicle;
selecting a selected class of vehicles from the plurality of vehicle classifications; and,
incrementing a lane-class vehicle count for each vehicle in the selected class detected in the selected lane.

24. The method as defined in claim 23 further comprising:
determining the velocity of each vehicle in the selected class of vehicles in the selected lane;
determining a lane-class velocity sum by summing the velocity of each vehicle in the selected class of vehicles in the selected lane; and,
determining an average velocity of the vehicles in the selected class of vehicles in the selected lane by dividing the lane-class velocity sum by the lane class velocity count.

25. The method of claim 5 further comprising the steps of:
coupling the traffic sensor to an external traffic management system; and,
transmitting a signal from the traffic sensor to the external traffic management system wherein the signal is representative of at least one of the position and the velocity of the vehicle.

26. A traffic sensor for obtaining vehicular traffic data within a field of view, the sensor comprising:
a transceiver unit for generating a frequency modulated microwave signal;
at least one transmitter antenna for (i) receiving the modulated microwave signal from the transceiver unit, (ii) forming a radiation beam, and (iii) radiating a transmitted radiated signal, comprising the modulated microwave signal in the radiation beam, at a vehicle;
a first receiver antenna for (i) receiving the modulated microwave signal reflected back from the vehicle, and (ii) generating a first received signal; and,
a second receiver antenna for (i) receiving the modulated microwave signal reflected back from the object, and (ii) generating a second received signal, wherein the first receiver antenna is spaced from the second receiver antenna, and the transceiver unit is connected to the first receiver antenna and to the second receiver antenna, to receive the first received signal from the first receiver antenna and the second received signal from the second receiver antenna;
a processor unit for determining a velocity and a position of a vehicle on a road, wherein the velocity is measured relative to the road and wherein the position comprises a lateral position of the vehicle across a width of the road and a longitudinal position of the vehicle along a length of the road, by
(a) determining the two-dimensional position of the vehicle on the road based on the time-varying modulated signal, the first received signal, and the second received signal during a single period of the time-varying modulated signal; and,
(b) repeating (a) at multiple times when the vehicle is within the field of view to determine a sequence of vehicle positions in two dimensions and the velocity of the vehicle from the sequence of vehicle positions in two dimensions.

27. The traffic sensor as defined in claim 26 further comprising
a timer for determining a dwell time of the vehicle within the field of view;
wherein the processor is further operable to determine a length of the vehicle based on the dwell time and the velocity of the vehicle.

28. The traffic sensor as defined in claim 27 further comprising a memory for storing a plurality of vehicle classifications, wherein the processor is linked to the memory and is further operable to assign a classification within the plurality of vehicle classifications to the vehicle based on the length of the vehicle.

29. The traffic sensor as defined in claim 26 wherein step a) comprises determining a difference between the first received signal and the second received signal to determine at least one of the lateral position and the longitudinal position of the vehicle within the field of view.

30. The traffic sensor as defined in claim 26 wherein step a) comprises
determining an angle of arrival of the reflected modulated microwave signal based on the time-varying modulated signal, and the difference between the first received signal and the second received signal;
determining the range of the vehicle by comparing one of the received signals to the transmitted radiated signal; and,
determining the lateral position and the longitudinal position of the vehicle from the range and angle of arrival.

31. The traffic sensor as defined in claim 30 wherein
a frequency of the time-varying modulated signal varies at a known rate;
the difference is a difference in phase between the first received signal and the second received signal; and,
the processor is operable to determine at least one of the longitudinal position and the lateral position of the vehicle within the field of view based on the known rate and the difference in phase.

32. The traffic sensor as defined in claim 30 wherein
the first receiver antenna is oriented to be parallel to a first axis;
the second receiver antenna is oriented to be at a non-zero angle to the first axis;
the difference is a difference in amplitude between the first received signal and the second received signal; and,
the processor is operable to determine the angle of arrival of the vehicle within the field of view based on the difference in amplitude between the first received signal and the second received signal.

33. The traffic sensor as defined in claim 26 wherein the processor is further operable to determine the number of vehicles traveling in a direction of traffic by incrementing a vehicle count for each vehicle detected traveling in the direction of traffic.

34. The traffic sensor as defined in claim 33 wherein the processor is further operable to determine an average velocity of vehicles traveling in the direction of traffic by
   determining a velocity sum by summing the velocity of each vehicle; and,
   dividing the velocity sum by the vehicle count.

35. The traffic sensor as defined in claim 26 wherein the processor is further operable to determine the number of vehicles traveling in a lane by incrementing a lane vehicle count for each vehicle detected in the lane.

36. The traffic sensor as defined in claim 35 wherein the processor is further operable to determine an average velocity of vehicles traveling in the lane by
   determining a lane velocity sum by summing the velocity of each vehicle detected traveling in the lane; and,
   dividing the lane velocity sum by the lane vehicle count.

37. The traffic sensor as defined in claim 26 further comprising
   a timer for determining a lane vehicle dwell time of each vehicle traveling in the lane within the field of view during an elapsed time;
   wherein the processor is further operable to determine a lane occupancy during the elapsed time by i) determining a sum of the lane vehicle dwell-times during the elapsed time and then ii) dividing the sum of the lane vehicle dwell-times by the elapsed time.

38. The traffic sensor as defined in claim 28 wherein the processor is further operable to determine the number of vehicles detected in a class of vehicles by, for each class of vehicles in the plurality of vehicle classifications, incrementing a class vehicle count for each vehicle detected in that class of vehicles.

39. The traffic sensor as defined in claim 38 wherein the processor is further operable to determine an average velocity of vehicles in a class of vehicles by
   determining a class velocity sum by summing the velocity of each vehicle in the class of vehicles; and,
   dividing the class velocity sum by the class vehicle count.

40. The traffic sensor as defined in claim 28 wherein the processor is further operable to, for at least one class of vehicles, determine the number of vehicles in the class of vehicles detected in a lane of the road by incrementing a lane-class vehicle count for each vehicle in the class of vehicles detected in the lane.

41. The traffic sensor as defined in claim 40 wherein the processor is further operable to determine, for at least one class of vehicles, an average velocity of vehicles in the class of vehicles detected in the lane by
   determining a lane-class velocity sum by summing the velocity of each vehicle in the class of vehicles detected in the lane; and,
   dividing the lane-class velocity sum by the lane-class vehicle count.

* * * * *